US009748040B2

(12) United States Patent
Reisch et al.

(10) Patent No.: US 9,748,040 B2
(45) Date of Patent: Aug. 29, 2017

(54) ELECTRONIC CONTROL DEVICE FOR CONTROLLING ACTUATORS

(75) Inventors: Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 705 days.

(21) Appl. No.: 14/352,095

(22) PCT Filed: Sep. 13, 2012

(86) PCT No.: PCT/EP2012/067917
§ 371 (c)(1),
(2), (4) Date: Apr. 16, 2014

(87) PCT Pub. No.: WO2013/056906
PCT Pub. Date: Apr. 25, 2013

(65) Prior Publication Data
US 2014/0239737 A1    Aug. 28, 2014

(30) Foreign Application Priority Data
Oct. 17, 2011    (DE) .......................... 10 2011 084 585

(51) Int. Cl.
*H01F 38/18* (2006.01)
*H01F 38/14* (2006.01)
(Continued)

(52) U.S. Cl.
CPC .......... *H01F 38/18* (2013.01); *F16D 25/0638* (2013.01); *F16D 25/10* (2013.01);
(Continued)

(58) Field of Classification Search
CPC ................. F16D 48/0206; F16D 25/10; F16D 2048/0221; F16H 63/3026; H01F 2038/143
See application file for complete search history.

(56) References Cited

U.S. PATENT DOCUMENTS

| | | |
|---|---|---|
| 5,749,060 A | 5/1998 | Graf et al. |
| 6,065,361 A * | 5/2000 | Martin ................... B62M 17/00 192/84.3 |

(Continued)

FOREIGN PATENT DOCUMENTS

| | | |
|---|---|---|
| DE | 103 42 013 A1 | 5/2005 |
| DE | 10 2007 024 503 B3 | 8/2008 |
| WO | WO 2009/112340 A1 | 9/2009 |

OTHER PUBLICATIONS

PCT Search Report, Jan. 31, 2012.
German Search Reoprt, May 16, 2012.
PCT International Preliminary Examination Report, Jan. 31, 2013.

*Primary Examiner* — Terence Boes
(74) *Attorney, Agent, or Firm* — Dority & Manning, P.A.

(57) ABSTRACT

An electronic control device for controlling at least one rotatably arranged actuator includes electronic components, such as a device for the contact-free reception of electrical energy and the contact-free reception of signals, a device for generating magnetic fields, and a common housing that encloses the electronic components and assimilates them. The control device is rotatable and designed for attaching on or into a component rotating around a rotational axis.

20 Claims, 5 Drawing Sheets

(51) Int. Cl.
*F16H 63/30* (2006.01)
*F16D 25/0638* (2006.01)
*F16D 25/10* (2006.01)
*F16D 48/02* (2006.01)
*F16K 31/04* (2006.01)

(52) U.S. Cl.
CPC ..... *F16D 48/0206* (2013.01); *F16H 63/3026* (2013.01); *F16K 31/042* (2013.01); *H01F 38/14* (2013.01); *F16D 2048/0221* (2013.01); *F16D 2048/0251* (2013.01); *F16H 2063/305* (2013.01); *H01F 2038/143* (2013.01)

(56) References Cited

U.S. PATENT DOCUMENTS

| | | | |
|---|---|---|---|
| 8,001,865 B2 * | 8/2011 | Muller | F16D 11/14 |
| | | | 310/12.14 |
| 8,028,596 B2 | 10/2011 | Reisch et al. | |
| 8,156,796 B2 | 4/2012 | Fuhrer | |
| 8,245,589 B2 * | 8/2012 | Mohr | F16H 61/32 |
| | | | 74/371 |
| 2007/0145315 A1 * | 6/2007 | Uemura | F04B 27/1804 |
| | | | 251/84 |
| 2012/0048049 A1 | 3/2012 | Reisch et al. | |
| 2014/0230591 A1 * | 8/2014 | Reisch | H02K 11/0094 |
| | | | 74/335 |
| 2014/0264112 A1 * | 9/2014 | Reisch | F16D 25/123 |
| | | | 251/129.11 |

* cited by examiner

ELECTRONIC CONTROL DEVICE FOR CONTROLLING ACTUATORS

FIELD OF THE INVENTION

The invention relates to an electronic control device for controlling rotatably arranged actuators, along with the use of the electronic control device.

BACKGROUND

With WO 2008/046737 A1 of the applicant, a manual transmission with switching devices for the shifting of gears was known, whereas idler gears are able to be shifted at a countershaft through a spindle/nut arrangement. Each switching device includes an electric actuator, which is arranged in a torque-proof manner in the countershaft. The actuators rotating with the countershaft receive their electrical power and signals without contact via a so-called "rotary signal transmitter." The rotary signal transmitter is an inductive transmission device that represents a type of transformer, with which a coil fixed to a location or fixed to a housing (primary winding) inductively functions together with a rotating coil arranged on the countershaft (secondary coil).

With WO 2009/112340 A1 of the applicant, a dual-clutch transmission with switching devices in the form of actuators was known. These devices are arranged coaxially and one after the other in a countershaft, and axially move on shifting devices arranged on the countershaft. The actuators rotating with the countershaft receive their electrical energy without contact from a power source fixed to a housing via an inductive rotary transmission device.

It is the task of this invention to arrange components of an electronic control device for actuators compactly and in a proper functional manner.

SUMMARY OF THE INVENTION

The objects of the invention are achieved by the electronic control device described and claimed herein. Additional objects and advantages of the invention will be set forth in part in the following description, or may be obvious from the description, or may be learned through practice of the invention.

In accordance with the invention, the electronic control device comprises a wide variety of electronic components, in particular a device for the contact-free reception of electrical power and signals, a device for the generation of magnetic fields and a common housing that encloses the electronic components. The control device is designed as a rotatable, closed structural unit (module), which can be installed on a rotating component or can be inserted into a rotating component. The electrical transmission of power preferably takes place on an inductive basis via a fixed-location, rotating part of the transmission device, which forms a first interface.

According to a preferred embodiment, the at least one actuator is electromagnetically operable and is in operative connection with the device for the generation of magnetic fields. Thereby, a second interface of the electronic control device is formed, through which the actuators are able to be activated without contact.

According to a further preferred embodiment, the at least one actuator comprises a hydraulic or pneumatic valve, i.e. the actuator is suitable for the control of various media. This may be advantageous, for example, if one form of energy or another is available "free of charge," such as with, for example, compressed air in commercial vehicles.

According to a further preferred embodiment, the actuators comprise a rotating drive or a translational drive. If the valve features a valve spindle, the valve spindle will be moved by the electric drive in rotations. With a valve tappet, a translational drive is effected through a magnetic coil and a magnetic armatures.

According to a further preferred embodiment, the rotating component is designed as a functional mounting, which at least partially incorporates the actuators. The functional mounting thereby functions as a valve housing, which essentially incorporates the valve part or the mechanical part of the actuator. The functional mounting, which features a multitude of valves, is the subject matter of an application simultaneously submitted by the applicant, with the title "Actuating device" and with U.S. application Ser. No. 14/352,104, filed Apr. 16, 2014, which is hereby incorporated in full for all purposes in the disclosure content of this application.

According to a further preferred embodiment, the housing of the electronic control device features hollow cylindrical actuator housings, which are distributed around the circumference and incorporate the actuators, in particular their electrical drives. Through the actuator housings, the actuators are positioned and fixed in reference to the housing and are also aligned with regard to the functional mounting. The actuator housings separate the pressure-less interior of the housing from the valve chamber, which is filled with a pressure medium.

According to a further preferred embodiment, the housing of the electronics module features a front wall, which is designed as an interface to the neighboring functional mounting. The front wall is open in the area of the actuators, such that the actuation movements can be directly transferred into the functional mountings. The actuators are arranged in part and in particular with their drive in the electronics module, and in part and in particular with their valve area in the functional mounting.

According to a further preferred embodiment, the front wall features connection fittings that are distributed around the circumference and are coaxially arranged on the actuator housings. Thus, the latter extend over the front wall to the outside, and engage in corresponding holes in the functional mounting. Thereby, the housing is centered in respect of the functional mounting, and is aligned in a circumferential direction.

According to a further preferred embodiment, each of the actuator housings forms a space that is able to be filled with transmission oil, which extends in an axially parallel direction into the functional mounting. In the space filled with oil, there are moving, i.e. rotatable or longitudinally movable, parts of the actuator, which are thereby bathed by oil. In the oil, the moving valve parts experience a buoyant force, which reduces or compensates for the centrifugal force on the valve parts that arises in operation.

According to a further preferred embodiment, electric motors are coaxially arranged on the actuator housings, whereas there is a housing wall between the external stator part and the internal rotor part. The magnetic field of the stator is transferred through the wall of the actuator housings to the rotor. Thereby, the actuator parts that are moving and running in the oil are sealed to the outside.

According to a further preferred embodiment, a magnetic coil is provided outside of the actuator housings, and magnetic armature is provided within the actuator housings, which actuates a valve tappet with a closure element. Likewise here, the magnetic field is transmitted through the actuator housings.

According to a further preferred embodiment, the moving parts of the actuator are arranged in floating form in transmission oil. This ensures that the moving valve parts, such as the valve spindle, valve tappet and armature shaft, experience a buoyant force, which at least partially compensates for the centrifugal force. Thus, despite the rotation of the functional mounting, the moving parts are able to move without major resistance.

According to a further preferred embodiment, the average density of the moving parts approaches the average density of the hydraulic fluid, preferably a hydraulic or transmission oil. This can be achieved, for example, through hollow construction (hollow armature shaft) or lightweight construction (plastic or light metal materials).

According to a further preferred embodiment, the device for power transmission comprises a secondary coil that is arranged in a rotating housing. Preferably, the secondary coil is arranged in the area of the inner or outer diameter of the ring-shaped housing, and inductively functions together with a primary coil arranged in a fixed housing, such that contact-free power transmission and bidirectional signal transmission are possible.

According to a further preferred embodiment, rotatably arranged, signal-generating sensors are allocated to the electronic control device. Thereby, it is possible that sensor information is supplied to the control device, and can be processed by it.

According to a further preferred embodiment, the electronic control device features a device for the contact-free reception of the signals for the sensors. Thus, the sensor information may be supplied without contact through the second interface of the electronic control device.

According to a further preferred embodiment, the sensors comprise position sensors. Thereby, for example, a diminishing shifting force can be recorded by a position measurement of the annular piston, and can be supplied to the control device as a deviation from the actual value.

According to further preferred embodiments, the housing of the electronics module is designed as a ring cylinder with a closed annular space, whereas the annular space incorporates electrical parts of actuators and sensors along with additional electronic components, and is able to be grouted with a sealing compound. Thereby, the electronics module is a massive block, and is thus in the position to absorb the centrifugal forces taking effect in the operation. In addition or alternatively, additional measures for reinforcing the structure of the housing, such as a bandaging of the outer circumference of the housing, are possible. The sealing compound may preferably contain fibers, such as carbon fibers or glass fibers, to increase stability.

According to a further aspect of the invention, the electronic control device described above is preferably used in a transmission, in particular an automatic transmission for motor vehicles. This achieves the advantage that, based on the frictionless transmission of power for the rotating actuators, the overall efficiency of the transmission is improved.

BRIEF DESCRIPTION OF THE DRAWINGS

Embodiments of the invention are shown in the drawing and more specifically described below, whereas additional characteristics and/or advantages may arise from the description and/or the drawing. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
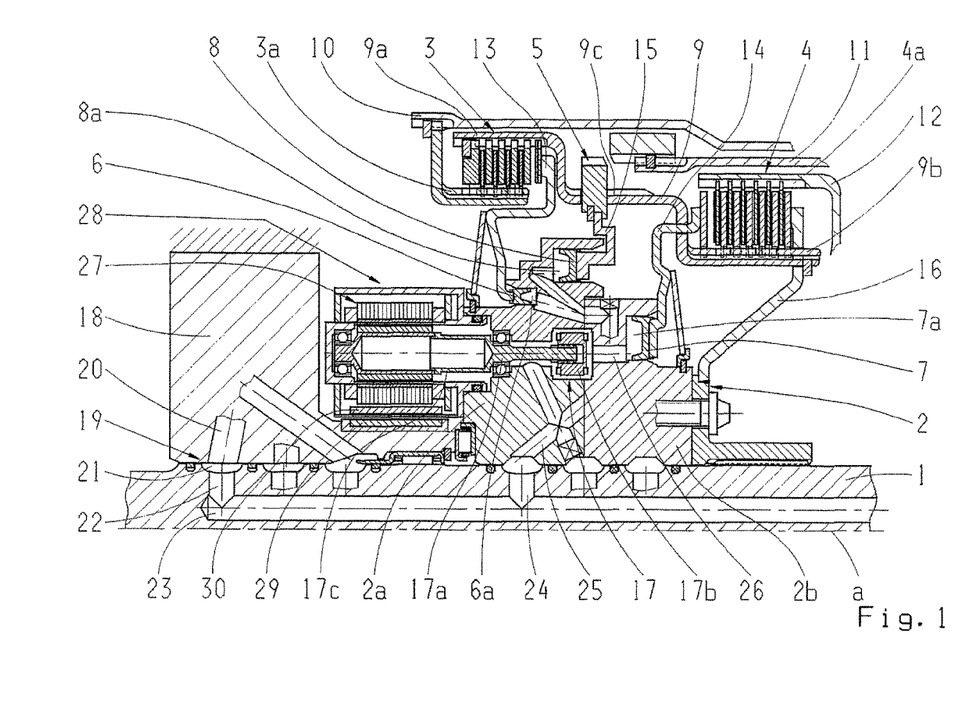
FIG. 1 an electronics module in accordance with the invention with an actuator, connected to a functional mounting on a gear shaft, FIG. 2 the electronics module with a position sensor, FIG. 3 the electronics module as a pre-assembled structural unit, FIG. 4 a carrier plate of the electronics module with stators of electronic motors, FIG. 5 the housing of the electronics module without a carrier plate, FIG. 6 the electronics module without actuators and FIG. 7 a diagram for the power and signal flow of the rotating electronics module.

FIG. 1 shows a section from an automatic transmission of a motor vehicle. On a gear shaft 1, a rotating component designed as a functional mounting 2 is arranged with a rotational axis "a" in a torque-proof manner. A total of three shifting elements, namely a first multi-disk clutch 3, a second multi-disk clutch 4 and a claw coupling 5, are connected to the functional mounting 2. Hydraulically operable shifting devices, designed as piston/cylinder units 6, 7, 8, are allocated to the shifting elements 3, 4, 5. Each of the shifting devices 6, 7 features a ring-shaped ring cylinder designed as a pressure space 6a, 7a, which is arranged in the functional mounting 2. The shifting elements 3, 4, 5 are connected on the drive side through a common, combined multi-disk/claw carrier 9 that, regarding the first multi-disk clutch 9, is designed as an outer multi-disk carrier 9a, regarding the second multi-disk clutch 4, is designed as an inner multi-disk carrier 9b, and regarding the claw coupling 5, is designed as a claw carrier 9c. The output side of the first multi-disk clutch 3 features an inner multi-disk carrier 3a, which is connected to a cylinder-shaped output element 10. The claw coupling 5 is connected to a further cylinder-shaped output element 11. The second multi-disk clutch 4 features an outer multi-disk carrier 4a, which forms the third output element 12. The first multi-disk clutch 3 is operated through a first annular piston 13, and the second multi-disk clutch 4 is operated through a second annular piston 14, while the claw coupling 5 is operated through several shifting arms 15 arranged around the circumference of the functional mounting 2. The combined multi-disk/claw carrier 9 is connected in a torque-proof manner to the functional mounting 2 through a connecting element 16, such that the drive sides of the three shifting elements 3, 4, 5 are connected to the gear shaft 1 through the functional mounting 2. Thereby, the functional mounting 2 is also the mounting of the shifting elements 3, 4, 5.

A shut-off valve 17 is arranged in the functional mounting 2, which comprises two interconnected bodies 2a, 2b. This shut-off valve 17 controls the supply of pressure oil to the pressure space 7a of the shifting device 7. A so-called "rotary oil supply" 19 is provided between a schematically represented transmission housing 18 and the gear shaft 1; i.e., the pressure oil is transferred from a fixed-housing channel 20 into an annular groove 21 in the gear shaft 1. From there, through a radial hole 22, an axial hole 23, and an additional radial hole 24, the pressure oil passes into an oil channel 25 of the functional mounting 2, and from there in the shut-off valve 17. From the shutoff valve 17, a pressure oil channel 26 leads into the pressure space 7*a*. The pressure oil supply to the additional pressure spaces 6*a*, 8*a* of the shifting devices 6, 8 is shown in part with dotted lines—the associated shut-off valves are not visible in the sectional view, as they are arranged in a manner moving in a circumferential direction. Generally, each shifting device 6, 7, 8 is equipped with a shut-off valve.

The shut-off valve 17 is electrically operated, in the embodiment shown through the electric motor 27, which is arranged in an electronic control device 28, also referred to as an electronics module 28. In connection with the electric motor 27, the shut-off valve 17 forms an actuator, also referred to as an actor. The shut-off valve 17 features a rotating spindle 17*a* and a valve closure element 17*b* connected through it to a movement thread. The rotating spindle 17*a* is connected to a hollow shaft 17*c*, on which an armature of the electric motor 27 (not shown with a reference number) is arranged. With a rotating functional mounting 2, the rotating spindle 17*a* and the hollow shaft 17*c* are subject to a centrifugal effect, which at least partially can be compensated for by the buoyant force of the pressure oil. Therefore, the moving parts of the actuator, i.e. the rotating spindle 17*a*, the valve closure element 17*b* and the hollow-designed armature shaft 17*c* are arranged in floating form in oil. The electronics module 28, in particular the electric motor 27, receives its electrical energy and its signals for closing and opening the shut-off valve 17 on an inductive basis. For this purpose, on the one hand, a primary coil 29 is arranged in the transmission housing 18 and, on the other hand, a secondary coil 30 is arranged in the electronics module 28. Additional details of the electronics module 28 in accordance with the invention are explained in connection with the description of FIGS. 3-7.

Figure 2:
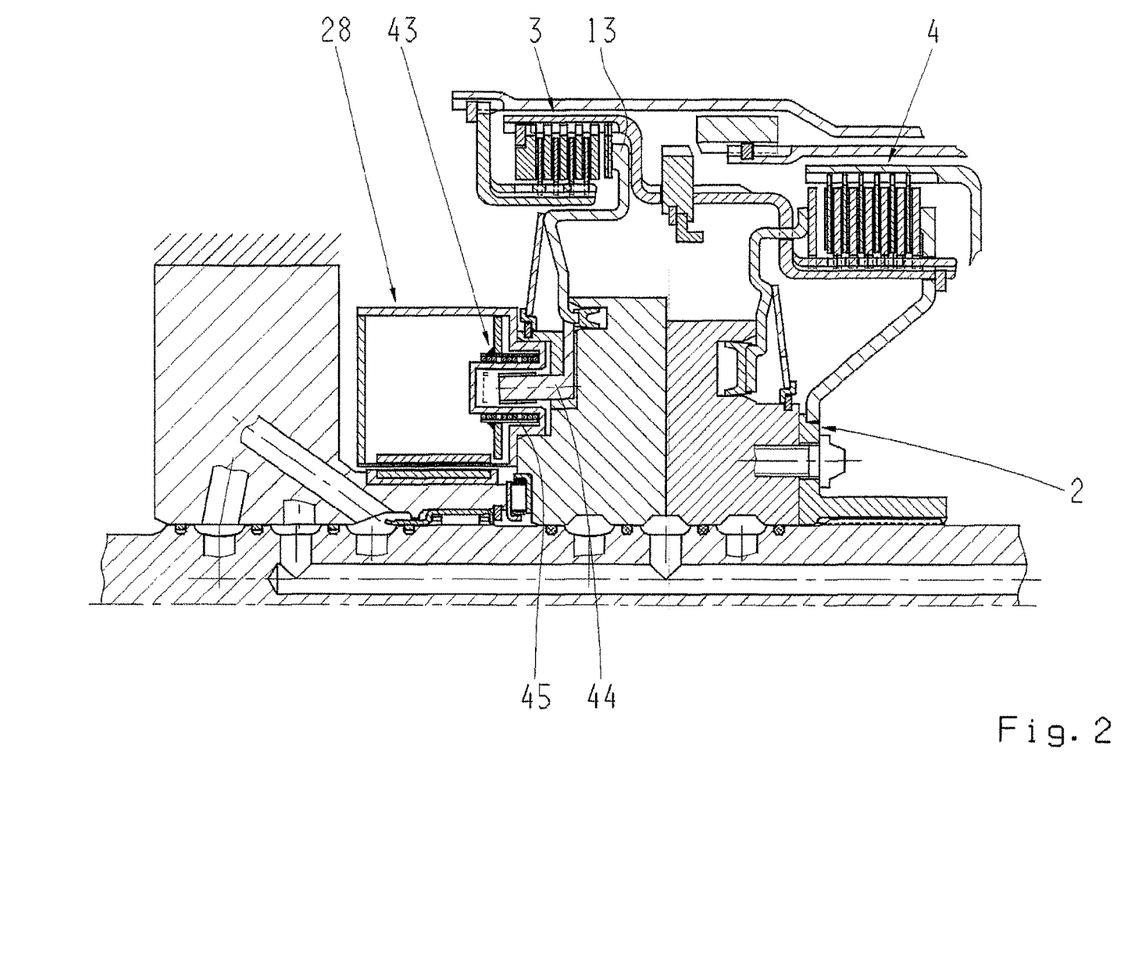

FIG. 2 shows an additional axial section through the functional mounting 2 and the shifting elements 3, 4 (as in FIG. 1, the same reference numbers are used for the same parts). A contact-free position sensor 43 is arranged on the electronics module 28, which operates, for example, according to the method of a differential transformer. The position sensor 43 comprises a transducer pin 44 attached to the annular piston 13 of the shifting element 3, and an acceptor part 45 designed as a cup arranged on the electronics module 28, in which the transducer pin 44 is immersed without contact. Several such position sensors may be arranged around the circumference of the electronics module 28. Pressure and/or force sensors also can be provided.

Figure 3:
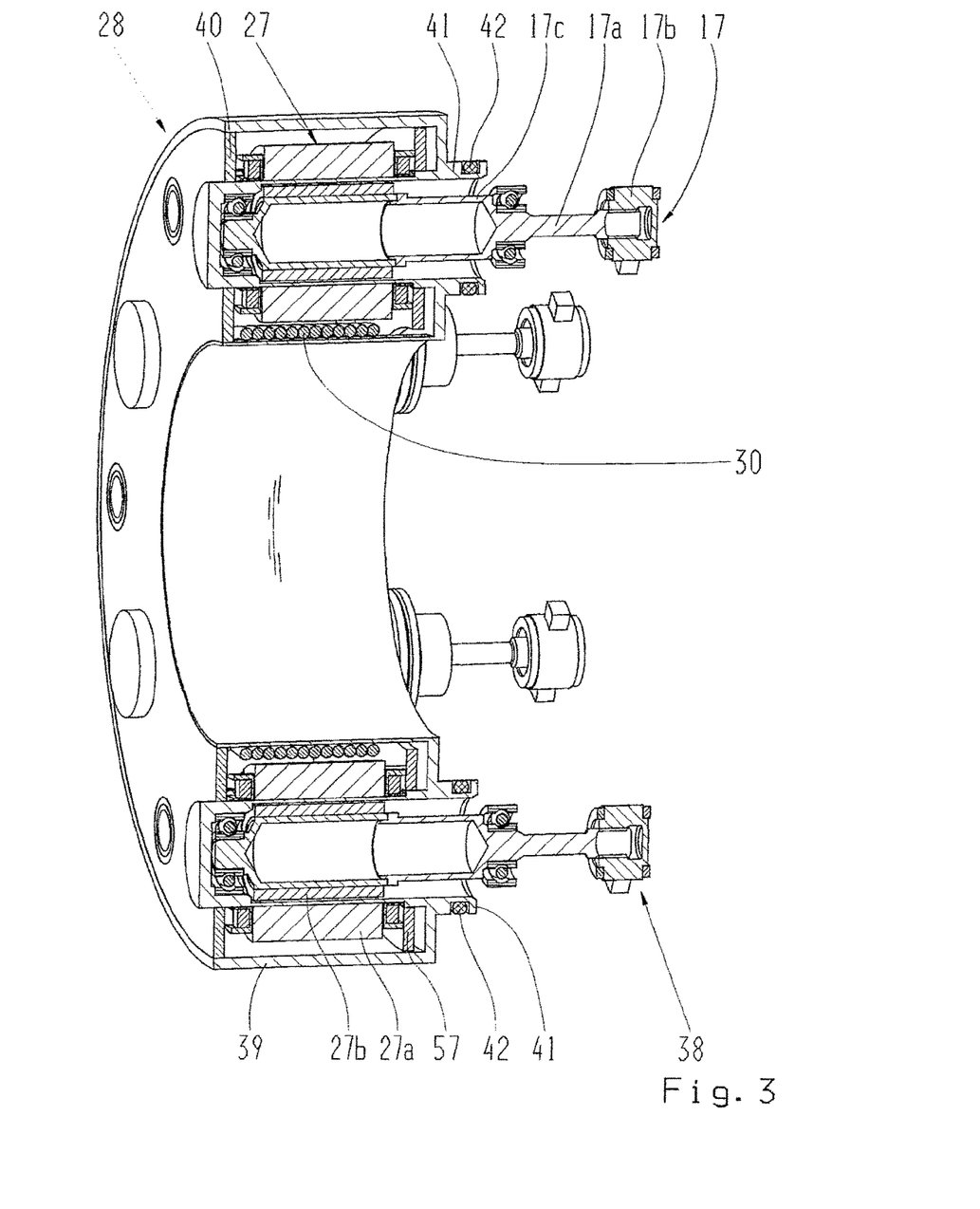

FIG. 3 shows the electronics module 28 as a separate structural unit in a perspective view, whereas two shut-off valves, the shut-off valve 17 shown in FIG. 1 and an additional identical shut-off valve 38 are shown in sections. The electronics module 28 features a housing 39 formed in a ring shape, which is sealed to the outside by a cover 40. The stator of the electric motor 27 is arranged inside the housing (as in FIG. 1, the same reference numbers are used for the same parts). On the housing 39, connection fittings 41 are molded, through which the electronics module 28 is connected to the body 2*a* of the functional mounting 2 (see FIG. 1). At the same time, a sealing of the oil chamber in the body 2*a* of the functional mounting 2 is effected through O-rings 42. In the drawing, four shut-off valves, two with the reference numbers 17, 38, and two more without reference numbers, can be seen. Thus, as a whole, six shut-off valves may be arranged around the circumference of the electronics module 28. As mentioned above, the rotating spindle 17*a* and the hollow shaft 17*c* run into the oil chamber. On the one hand, they are subject to a centrifugal force effect and, on the other hand, they experience a buoyant force acting against the centrifugal force, which is determined by the weight of the quantity of the displaced oil. In order to achieve an extensive compensation of the centrifugal force effect, the armature shaft 17*c* is hollow. In addition, materials with low specific weight are preferably used, in order to minimize the centrifugal force effect. As can be seen from the drawing, the hollow shaft 17*c* is mounted twice. In place of the electric motor 27 for producing a rotating movement, a magnet may also be used in connection with a valve tappet, depending on the type of magnetic valve. The translational motion of the valve tappet is then directly transferred to the closure element. As mentioned above, the transmission of electrical energy is effected on an inductive basis. For this purpose, the secondary winding 30 is arranged within the electronics module 28 in the radial internal area, which is in operative connection with the primary winding not shown here (see FIG. 1). A plate 57 is shown on the side of the connection fittings 41. The plate is used for the electrical connection of the components with each other. In addition, the plate is used for the positioning of the parts to each other, in particular until they are sealed in the housing.

The electronics module and the functional mounting may also be equipped with additional actuators, such as with electrically controllable cooling and lubricating oil valves, as this is the subject matter of an application simultaneously submitted by the applicant with U.S. application Ser. No. 14/352,100, filed Apr. 16, 2014, which is incorporated in full in the disclosure content of this application.

Figure 4:
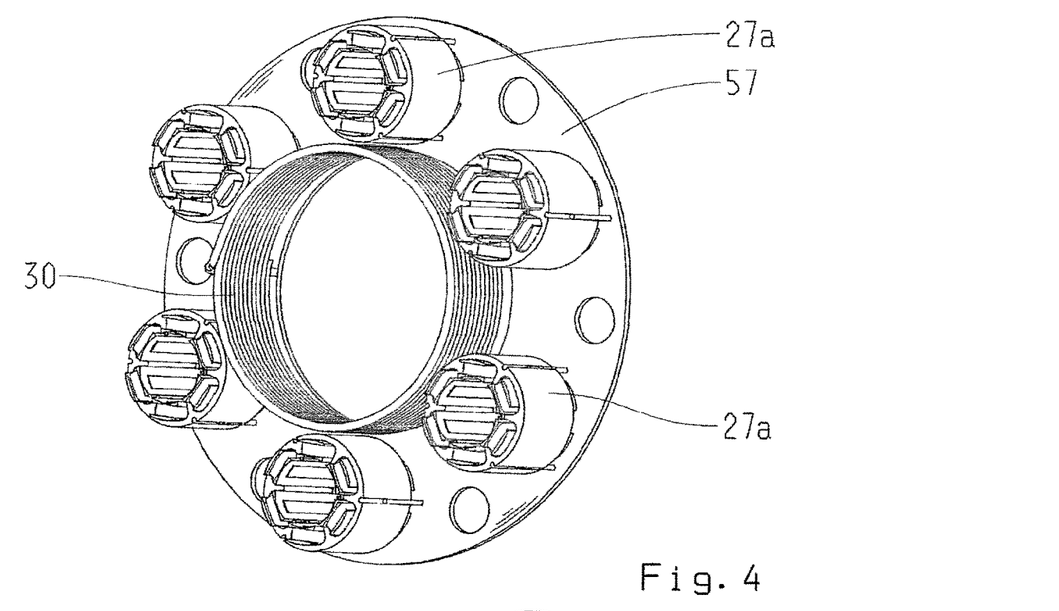

FIG. 4 shows an electronic plate 57, which is used as a support for the station of the electric motors, the secondary coil and additional electronic components not shown here.

Figure 5:
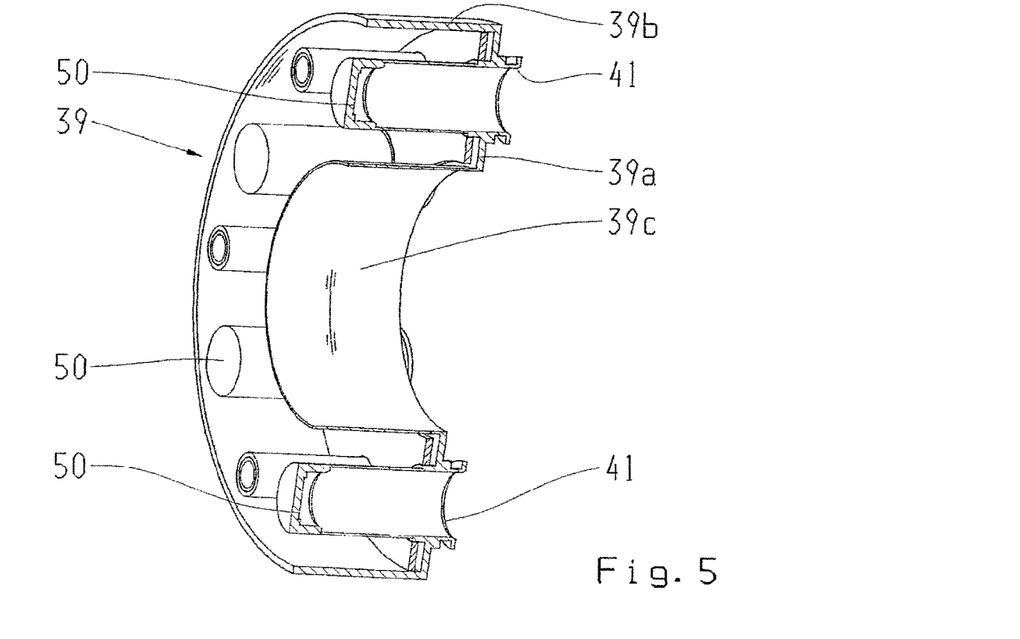

FIG. 5 shows the housing 39 of the electronics module 38 without the cover 40. The housing 39 features the shape of an open ring cylinder, which is formed by a front wall 39*a*, an outer cylinder wall 39*b* and an inner cylinder wall 39*c*. On the front wall 39*a*, actuator housings 50 designed as cups are molded, which are coaxially arranged on the connection fittings 41 protruding externally from the front wall 39*a*. The housing 39, with actuator housings 50 and connection fittings 41, is preferably produced in one piece as a cast part, in particular as a molded plastic part, whereas plastic reinforced by fibers is preferably used. In addition, the housing 39, in particular the outer cylinder wall 39*b*, may be reinforced by a bandage (not shown) for absorbing the centrifugal forces. The inside of the housing 39 is grouted with a sealing compound, preferably a fiber-reinforced plastic. Thereby, the electronic components are fixed and held in the housing 39. Thus, the actuator housing 50 is sealed to the ring-shaped interior of the housing 39.

Figure 6:
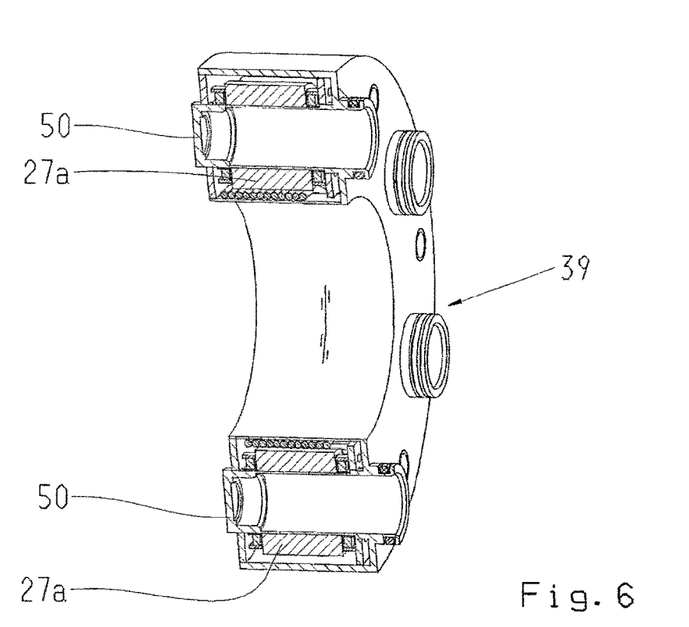

FIG. 6 shows the housing 39, complete with the supporting disk 40 in accordance with FIG. 4. The actuator housings 50 push through the stator 27*a* of the electric motor 27, whereas the wall thickness is designed as relatively thin in the area of the magnetic field. However, the annular space in which the stators 27*a* are located are hermetically sealed against the interior of the actuator housings 50. Generally, all electronic components are enclosed by the housing 39, and are thus separated from the hydraulic or pneumatic pressure spaces.

Figure 7:
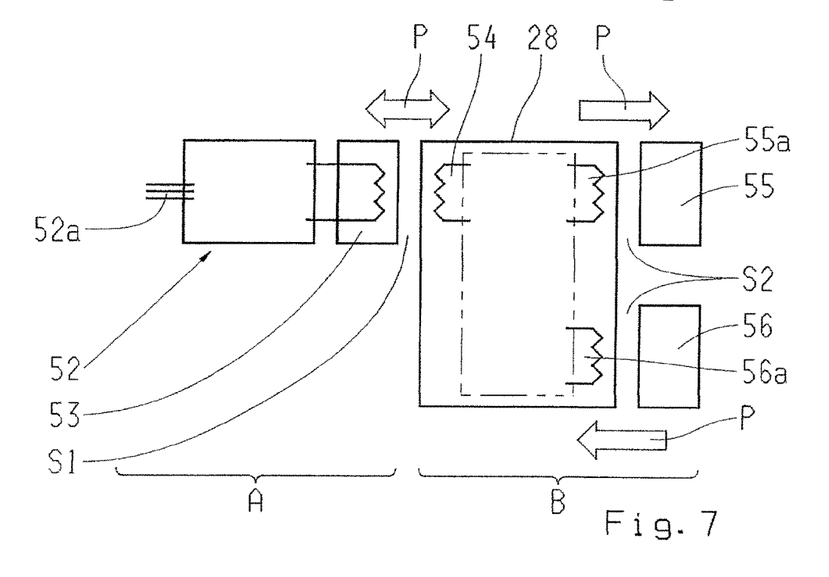

FIG. 7 shows a schematic representation of power and signal transmission to and from the rotating electronic control device 28, also referred to as the electronics module 28. A fixed-housing electronic control device 52 is allocated to the rotating electronic control device 28, which is connected to the wiring system of the motor vehicle through wires 52a. A transmission device for contact-free power transmission comprises a first fixed-housing primary coil 53 and a first secondary coil 54 rotating with the electronic control device 28. The primary coil 53 and the secondary coil 54 form a first interface S1 between the transmitting and receiving device on a preferably inductive basis. A co-rotating, electromagnetically controllable actuator 55 receives signals and electrical energy from a receiving device designed as a second primary coil 55a, and a likewise co-rotating sensor 56 sends signals to a receiving device 56a of the electronic control device 28. This results in a second interface S2 between the electronic control device 28 and the actuators 55 along with the sensors 56. The power and signal transmission at the two interfaces S1, S2 is effected by the housing wall (not shown here) throughout the electronic control device 28. The signal and power transmission directions are represented by the arrows P. The fixed-housing part of the overall device is designated with a bracket A, and the rotating part of the device is designated with a bracket B.

Modifications and variations can be made to the embodiments illustrated or described herein without departing from the scope and spirit of the invention as set forth in the appended claims.

The invention claimed is:

1. A combination of an electronic control device and a rotatably arranged actuator, comprising:
   the electronic control device comprising:
      a plurality of electronic components, including devices that provide contact-free reception of electrical energy or control signals, or devices that provide contact-free generation of magnetic fields;
      a common housing, the electronic components assimilated within the common housing;
   wherein the control device is configured and rotatable with the actuator, the common housing configured to attach the control device onto or within a component that rotates around a rotational axis.

2. The combination as in claim 1, wherein the actuator is electromagnetically actuated and is arranged at least partially outside of the common housing and electromagnetically connected with the device within the common housing that provides contact-free generation of magnetic fields.

3. The combination as in claim 2, wherein the actuator comprises a hydraulic valve or a pneumatic valve.

4. The combination as in claim 3, wherein the actuator comprises a rotating drive or a translational drive.

5. The combination as in claim 1, wherein the rotating component is a functional mounting arranged on a rotating shaft, the actuator contained at least partially in the functional mounting.

6. The combination as in claim 5, wherein the common housing comprises a front wall configured as an interface with the functional mounting.

7. The combination as in claim 6, comprising a plurality of the actuators, the common housing comprising a corresponding number of hollow cylindrical actuator housings disposed around a circumference of the common housing, each of the actuators operably housed at least partially in a respective one of the actuator housings.

8. The combination as in claim 7, wherein the front wall comprises a connection fitting axially aligned with each actuator housing, the connection fittings attaching to the functional mounting.

9. The combination as in claim 7, wherein each actuator housing defines a space that is fillable with oil from the functional mounting, the space defined axially parallel with a rotational axis of the functional mounting.

10. The combination as in claim 9, wherein movable parts of the actuator within the actuator housing are immersed in hydraulic oil.

11. The combination as in claim 10, wherein the movable parts are made of a material and shape so as to have an average density corresponding to that of the hydraulic oil.

12. The combination as in claim 7, wherein an electric motor is coaxially configured with each actuator housing, the electric motor comprising a stator arranged on an outside of the actuator housing and a rotor a ranged on an inside of the actuator housing.

13. The combination as in claim 7, wherein a magnetic coil is coaxially arranged on an outside of each actuator housing, and a magnetic armature is coaxially arranged on an inside of each actuator housing.

14. The combination as in claim 1, wherein the device that provides contact-free reception of electrical energy or control signals comprises a secondary coil arranged at one of a radially inner or radially outer area within the common housing.

15. The combination as in claim 1, further comprising a signal generating sensor rotatably mounted with the electronic control device, the electronic control device in contact-free reception of signals from the signal generating sensor.

16. The combination as in claim 15, wherein the signal generating sensor is a position sensor.

17. The combination as in claim 1, wherein the common housing comprises a ring cylinder defining a closed annular space sealed with a sealing compound.

18. The combination as in claim 1, wherein the common housing comprises a ring cylinder defining a closed annular space, and further comprising a supporting bandage arranged around a peripheral side of the ring cylinder.

19. The combination as in claim 1, wherein the common housing comprises a ring cylinder defining a closed annular space, the common housing made from a fiber-reinforced plastic material.

20. A transmission of a motor vehicle, comprising:
   a rotating gear shaft;
   a functional mounting arranged on the rotating shaft;
   an actuator contained at least partially in the functional mounting;
   an electronic control device for controlling the actuator, the electronic control device further comprising:
      a plurality of electronic components, including devices that provide contact-free reception of electrical energy or control signals, or devices that provide contact-free generation of magnetic fields;
      a common housing, the electronic components assimilated within the common housing; and
   wherein the control device is configured and rotatable with the actuator, and the common housing is attached to the functional mounting.

* * * * *